(12) United States Patent
Song et al.

(10) Patent No.: US 11,397,928 B2
(45) Date of Patent: Jul. 26, 2022

(54) METHOD FOR ISSUING, REDEEMING, REFUNDING, SETTLING AND REVOKING ELECTRONIC VOUCHER BY USING UTXO-BASED PROTOCOL, AND SERVER EMPLOYING SAME

(71) Applicant: Coinplug, Inc., Gyeonggi-do (KR)

(72) Inventors: Joo Han Song, Gyeonggi-do (KR); Jay Wu Hong, Seoul (KR); Joon Sun Uhr, Gyeonggi-do (KR)

(73) Assignee: COINPLUG, INC., Seongnam (KR)

( * ) Notice: Subject to any disclaimer, the term of this patent is extended or adjusted under 35 U.S.C. 154(b) by 69 days.

(21) Appl. No.: 16/375,774

(22) Filed: Apr. 4, 2019

(65) Prior Publication Data

US 2019/0236560 A1    Aug. 1, 2019

Related U.S. Application Data

(63) Continuation of application No. PCT/KR2017/011203, filed on Oct. 11, 2017.

(30) Foreign Application Priority Data

Oct. 11, 2016   (KR) .................. 10-2016-0131083

(51) Int. Cl.
  *G06Q 20/06*       (2012.01)
  *G06Q 20/38*       (2012.01)
  (Continued)

(52) U.S. Cl.
  CPC ........... *G06Q 20/06* (2013.01); *G06Q 20/389* (2013.01); *G06Q 20/3825* (2013.01);
  (Continued)

(58) Field of Classification Search
  CPC ....... G06F 21/33; G06Q 20/389; G06Q 30/04
  See application file for complete search history.

(56) References Cited

U.S. PATENT DOCUMENTS 10,097,356 B2 *  10/2018  Zinder ................. H04L 9/3247
2017/0331896 A1 * 11/2017  Holloway ............... H04L 9/12
2018/0075028 A1 *  3/2018  Ruschin ................ G06Q 10/00

FOREIGN PATENT DOCUMENTS

CA          3049761 A1 *  7/2018  ......... A63B 21/0407
KR       10-1575030 B1    12/2015
KR       10-1637854 B1     7/2016

OTHER PUBLICATIONS

Heilman et al., Blindly Signed Contracts: Anonymous On-Blockchain and Off-Blockchain Bitcoin Transactions, Financial Cryptography and Data Security, Aug. 31, 2016, p. 43-60.*

(Continued)

*Primary Examiner* — Ilse I Immanuel
(74) *Attorney, Agent, or Firm* — Xsensus LLP

(57) ABSTRACT

The present invention provides a method for issuing an electronic voucher, the method comprising: (a) a step in which a server checks whether or not (i) electronic voucher data, (ii) a public key of a specific issuer and (iii) a signature value of the specific issuer are valid; and (b) a step in which, if the validity check result is positive, the server registers or supports the registration of a function value associated with (i) the electronic voucher data, (ii) the public key of the specific issuer and (iii) the signature value of the specific issuer in a public blockchain network, and acquires or supports the acquisition of Txid indicating information on the location of the function value, registered in the public blockchain network, within the public blockchain network.

9 Claims, 7 Drawing Sheets

(51) Int. Cl.
*G06Q 30/02* (2012.01)
*G06Q 30/04* (2012.01)

(52) U.S. Cl.
CPC ......... *G06Q 20/3829* (2013.01); *G06Q 30/02* (2013.01); *G06Q 30/04* (2013.01); *G06Q 2220/00* (2013.01)

(56) References Cited

OTHER PUBLICATIONS

Shin, Laura, "Why the Bitcoin Blockchain Could Make Gift Cards, A Consumer Favorite, Even More Beloved", Forbes, Jun. 17, 2015, Internet: <URL: https://www.forbes.com/sites/laurashin/2015/06/17/why-the-bitcoin-blockchain-would-make-gift-cards-a-consumer-favorite-even-more-beloved/#72cba5811b57>, pp. 104.

Olavsrud, Thor, "Why Blockchain Can Be Fatal to Your Company", CIO Korea, Sep. 7, 2016, Internet: http://www.ciokorea.com/print/3161, pp. 1-3.

Wuille, Pieter, "Tree Signatures", Blockstream, Aug. 24, 2015, Internet: URL:https://blockstream.com/2015/08/24/treesignatures.html, pp. 1-6.

Kim, Kang Mo, "Data Forgery Detection of Private Blockchain using Public Blockchain", GitHub, Aug. 5, 2016, Internet:<URL: https://github.com/Kangmo/blitz/wiki/%ED%8D%BC%EB%B8%94%EB%A6%AD-EB%B8%94%EB%AI%9D%EC%B2%B4%EC%9D%B8%EC%9D%84-%ED%99%9C%EC%9A%A9%ED%95%9C-%ED%84%94%EB%9D%BC%EC%9D%B4%EB%B9%97-%EB%B8%94%EB%AI%9D%EC%B2%B4%EC%9D%B8%EC%9D%98-EB%8D%B0%EC%9D%B4%ED%84%B0-EC%9C%84%EB%B3%80%EC%A1%B0-0-% ED%83%90%EC%A7%80>.

International Search Report for Application No. PCT/KR2017/011203, dated May 30, 2018.

* cited by examiner

METHOD FOR ISSUING, REDEEMING, REFUNDING, SETTLING AND REVOKING ELECTRONIC VOUCHER BY USING UTXO-BASED PROTOCOL, AND SERVER EMPLOYING SAME

CROSS REFERENCE TO RELATED APPLICATIONS

The present application is a continuation of International Application PCT/KR2017/011203, entitled "METHOD FOR ISSUING, REDEEMING, REFUNDING, SETTLING AND REVOKING ELECTRONIC VOUCHER BY USING UTXO-BASED PROTOCOL, AND SERVER EMPLOYING SAME," filed on Oct. 11, 2017, which claims the benefit of Basic Korean Patent Application Serial No. 10-2016-0131083, entitled "UTXO METHOD FOR ISSUING USING REFUNDING SETTLING AND REVOCATING ELECTRIC VOUCHER IN USE OF UNSPENT TRANSACTION OUTPUT BASED PROTOCOL AND SERVER USING THE SAME," filed on Oct. 11, 2016, all of which is specifically incorporated by reference for all they disclose and teach.

FIELD OF THE DISCLOSURE

The present disclosure relates to a method for issuing at least one specific electronic voucher by at least one specific issuer; and more particularly, to the method of determining validities of issuing data and registering a function value in a public blockchain network, and the server using the same.

BACKGROUND OF THE DISCLOSURE

A voucher, including a coupon or a gift certificate, is a certificate or financial instrument where the number or monetary amount for goods or services is written. It is issued for the purpose of publicity and promotion of products or services, and generally refers to a discount ticket that can be redeemed for a financial discount or rebate when a person who previously bought a certain product purchases the certain product again, or refers to a coupon that can be exchanged with a prize when a person buys one or more products worth more than a certain amount.

Recently, various vouchers for plays, movies and books in addition to vouchers for purchases at a restaurant or at a department store have seen common use, and electronic coupons are also common as the Internet becomes popular.

However, electronic vouchers such as mobile coupons, gift coupons, or discount coupons mostly adopt a barcode or a registration number which are transferred as images in SMS messages, and as a result, data of such a type may be vulnerable to forgery and illegal copying. Also, there is a problem of duplicate issuance of a same coupon caused by a system malfunction, rendering the coupon invalid.

SUMMARY OF THE DISCLOSURE

It is an object of the present disclosure to solve all the aforementioned problems.

It is another object of the present disclosure to provide a method of registering an electronic voucher in a blockchain network to prevent forgery and illegal copying, and a server using the same.

It is still another object of the present disclosure to provide a method of securing information on activities including usage of the electronic voucher, and preventing forgery and illegal copying thereof, by using specific functions and a cryptography, and the server using the same.

It is still yet another object of the present disclosure to provide a method of preventing duplicate issuance of a same electronic voucher, by registering the electronic voucher in the blockchain network, and the server using the same.

In accordance with one aspect of the present disclosure, there is provided a method for issuing at least one specific electronic voucher by at least one specific issuer, including steps of: (a) a server, if (i) specific issuing data, (ii) a public key of the specific issuer, and (iii) a signature value of the specific issuer generated by signing a voucher function value of the specific issuing data or a value including the voucher function value with a private key of the specific issuer, are acquired, performing or supporting another device to perform a process of determining each of validities of (i) the specific issuing data, (ii) the public key of the specific issuer, and (iii) the signature value of the specific issuer; and (b) the server, if each of the validities is confirmed, performing or supporting another device to perform processes of (b-1) registering in a public blockchain network a first function value of (i) the specific issuing data, (ii) the public key of the specific issuer, and (iii) the signature value of the specific issuer, and (b-2) acquiring a first transaction ID representing a location of the first function value on the public blockchain network.

As one example, at the step of (b), the server performs or supports another device to perform processes of registering in a private blockchain network a voucher-issuing transaction including (i) the specific issuing data, (ii) the public key of the specific issuer, and (iii) the signature value of the specific issuer, and providing a PrivTxid representing a location of the voucher-issuing transaction on the private blockchain network to the specific issuer.

As one example, at the step of (a), the server performs or supports another device to perform a process of comparing (i) a function value generated by applying a specific function to the specific issuing data, and (ii) a value generated by applying the public key of the specific issuer to the signature value of the specific issuer, to thereby determine whether the specific issuing data is valid.

As one example, the specific issuing data includes at least one of (i) information on a type of the specific electronic voucher, (ii) a public key of a specific user who is a buyer of the specific electronic voucher, (iii) issuance value information of the specific electronic voucher, (iv) unique ID information of the specific issuer, and (v) information on an expiration date of the specific electronic voucher.

As one example, the unique ID information includes a function value of the public key of the specific issuer or a value including the function value of the public key of the specific issuer.

As one example, at the step of (a), the server determines or supports another device to determine whether the signature value of the specific issuer is valid, by using the public key of the specific issuer registered by the specific issuer.

As one example, the method, before the step of (a), further comprises steps of: (a01) the server, if a request for registration of the specific issuer with the public key of the specific issuer is acquired, performing or supporting another device to perform processes of determining whether the specific issuer is valid, and transmitting a random nonce to the specific issuer who is determined as valid; and (a02) the server, if a signature value of the random nonce generated by signing the random nonce with the private key of the specific issuer is acquired, performing or supporting another device to perform processes of (i) verifying whether the signature value of the random nonce is legitimately signed, by using the public key of the specific issuer, (ii) registering a second function value of (ii-1) the random nonce, (ii-2) the signature value of the random nonce, and (ii-3) the public key of the specific issuer, in the public blockchain network, and (iii) acquiring a second transaction ID representing a location of the second function value on the public blockchain network.

As one example, at the step of (a02), the server performs or supports another device to perform processes of registering in a private blockchain network an issuer-registering transaction including (i) the random nonce, (ii) the signature value of the random nonce, and (iii) the public key of the specific issuer, and providing a PrivTxid representing a location of the issuer-registering transaction on the private blockchain network to the specific issuer.

As one example, at the step of (a01), the server determines or supports another device to determine whether the specific issuer is valid, by using a certificate based on a public key infrastructure or by using information on an identification of the specific issuer.

In accordance with another aspect of the present disclosure, there is provided a method for using at least one specific electronic voucher by at least one specific user, including steps of: (a) a server, if (i) specific usage data including a PrivTxid corresponding to the specific electronic voucher with partly unused amount beforehand, (ii) a public key of the specific user, and (iii) a signature value of the specific user generated by signing a voucher function value of the specific usage data or a value including the voucher function value with a private key of the specific user, are acquired, performing or supporting another device to perform a process of determining each of validities of (i) the specific usage data, (ii) the public key of the specific user, and (iii) the signature value of the specific user; and (b) the server, if each of the validities is confirmed, performing or supporting another device to perform processes of (b-1) registering in a public blockchain network a first function value of (i) the specific usage data, (ii) the public key of the specific user, and (iii) the signature value of the specific user, and (b-2) acquiring a first transaction ID representing a location of the first function value on the public blockchain network.

As one example, at the step of (b), the server performs or supports another device to perform processes of registering in a private blockchain network a voucher-using transaction including (i) the specific usage data, (ii) the public key of the specific user, and (iii) the signature value of the specific user, and providing a PrivTxid representing a location of the voucher-using transaction on the private blockchain network to the specific user.

As one example, the specific usage data further includes at least one of (i) information on a type of the specific electronic voucher, (ii) a public key of a specific seller who is a receiver of the specific electronic voucher, (iii) usage value information, to be used currently, among value information on the specific electronic voucher, (iv) a unique ID of a specific issuer who issued the specific electronic voucher, (v) information on an expiration date of the specific electronic voucher, (vi) remaining value information on amount after use of the usage value information, and (vii) a public key of the specific user for confirming the remaining value information.

As one example, the method, before the step of (a), further comprises steps of: (a01) the server, if a request for registration of the specific user by using the public key of the specific user is acquired, performing or supporting another device to perform processes of determining if the specific user is valid, and if the specific user is determined as valid, transmitting a random nonce to the specific user; and (a02) the server, if a signature value of the random nonce generated by signing the random nonce with the private key of the specific user is acquired, performing or supporting another device to perform processes of (i) verifying whether the signature value of the random nonce is legitimately signed, by using the public key of the specific user, (ii) registering a second function value of (ii-1) the random nonce, (ii-2) the signature value of the random nonce, and (ii-3) the public key of the specific user, in the public blockchain network, and (iii) acquiring a second transaction ID representing location information of the second function value on the public blockchain network.

As one example, at the step of (a02), the server performs or supports another device to perform processes of registering in a private blockchain network a user-registering transaction including (i) the random nonce, (ii) the signature value of the random nonce, and (iii) the public key of the specific user, and providing a PrivTxid representing location information of the user-registering transaction on the private blockchain network to the specific user.

In accordance with still another aspect of the present disclosure, there is provided a method for refunding at least one specific electronic voucher by at least one specific user, including steps of: (a) a server, if (i) specific refunding data including a PrivTxid corresponding to the specific electronic voucher expired with partly unused amount beforehand, (ii) a public key of the specific user, and (iii) a signature value of the specific user generated by signing a voucher function value of the specific refunding data or a value including the voucher function value with a private key of the specific user are acquired, performing or supporting another device to perform a process of determining each of validities of (i) the specific refunding data, (ii) the public key of the specific user, and (iii) the signature value of the specific user; and (b) the server, if each of the validities is confirmed, performing or supporting another device to perform processes of (b-1) registering in a public blockchain network a refund function value of (i) the specific refunding data, (ii) the public key of the specific user, and (iii) the signature value of the specific user, and (b-2) acquiring a transaction ID representing location information of the refund function value registered at the step of (b-1) on the public blockchain network.

As one example, at the step of (b), the server performs or supports another device to perform processes of registering in a private blockchain network a voucher-refunding transaction including (i) the specific refunding data, (ii) the public key of the specific user, and (iii) the signature value of the specific user, and providing a PrivTxid representing location information of the voucher-refunding transaction on the private blockchain network to the specific user.

As one example, the specific refunding data includes at least one of (i) information on a type of the specific electronic voucher, (ii) a public key of a specific issuer of the specific electronic voucher, (iii) refund value information of the specific electronic voucher, (iv) unique ID information of the specific issuer, and (v) information on an expiration date of the specific electronic voucher.

In accordance with still yet another aspect of the present disclosure, there is provided a method for settling one or more specific electronic vouchers by at least one specific seller, including steps of: (a) a server, if (i) specific settling data including (i-1) one or more first PrivTxids corresponding to the specific electronic vouchers with each of partly unused amounts at a time of creating a voucher-settling transaction and (i-2) the number of said one or more first PrivTxids in the voucher-settling transaction and, (ii) a public key of the specific seller, and (iii) a signature value of the specific seller generated by signing a voucher function value of the specific settling data or a value including the voucher function value with a private key of the specific seller, are acquired, performing or supporting another device to perform a process of determining each of validities of (i) the specific settling data, (ii) the public key of the specific seller, and (iii) the signature value of the specific seller; and (b) the server, if each of the validities is confirmed, performing or supporting another device to perform processes of (b-1) registering in a public blockchain network a first function value of (i) the specific settling data, (ii) the public key of the specific seller, and (iii) the signature value of the specific seller, and (b-2) acquiring a first transaction ID representing location information of the first function value on the public blockchain network.

As one example, at the step of (b), the server performs or supports another device to perform processes of registering in a private blockchain network the voucher-settling transaction including (i) the specific settling data, (ii) the public key of the specific seller, and (iii) the signature value of the specific seller, and providing a PrivTxid representing location information of the voucher-settling transaction on the private blockchain network to the specific seller.

As one example, the specific settling data further includes at least one of (i) information on a type of the specific electronic vouchers, (ii) at least one public key of at least one specific issuer who is an issuer of the specific electronic vouchers, (iii) settling value information of the specific electronic vouchers, and (iv) unique ID information of the specific issuer.

As one example, the method, before the step of (a), further comprises steps of: (a01) the server, if a request for registration of the specific seller using the public key thereof is acquired and if the specific seller is determined as valid, transmitting or supporting another device to transmit a random nonce to the specific seller; and (a02) the server, if a signature value of the random nonce generated by signing the random nonce with the private key of the specific seller is acquired, performing or supporting another device to perform processes of (i) verifying whether the signature value of the random nonce is legitimately signed, by using the public key of the specific seller, (ii) registering a second function value of (ii-1) the random nonce, (ii-2) the signature value of the random nonce, and (ii-3) the public key of the specific seller, in the public blockchain network, and (iii) acquiring a second transaction ID representing location information of the second function value on the public blockchain network.

As one example, at the step of (a02), the server performs or supports another device to perform processes of registering in a private blockchain network a seller-registering transaction including (i) the random nonce, (ii) the signature value of the random nonce, and (iii) the public key of the specific seller, and providing a second PrivTxid representing location information of the seller-registering transaction on the private blockchain network to the specific seller.

In accordance with still yet another aspect of the present disclosure, there is provided a method for revoking at least one specific electronic voucher by at least one specific issuer, including steps of: (a) a server, if (i) specific revocating data including a PrivTxid corresponding to the specific electronic voucher expired with partly unused amount beforehand, (ii) a public key of the specific issuer, and (iii) a signature value of the specific issuer generated by signing a voucher function value of the specific revocating data or a value including the voucher function value with a private key of the specific issuer are acquired, performing or supporting another device to perform a process of determining each of validities of (i) the specific revocating data, (ii) the public key of the specific issuer, and (iii) the signature value of the specific issuer; and (b) the server, if each of the validities is confirmed, performing or supporting another device to perform processes of (b-1) registering in a public blockchain network a revocation function value of (i) the specific revocating data, (ii) the public key of the specific issuer, and (iii) the signature value of the specific issuer, and (b-2) acquiring a transaction ID representing location information of the revocation function value on the public blockchain network.

As one example, at the step of (b), the server performs or supports another device to perform processes of registering in a private blockchain network a voucher-revocating transaction including (i) the specific revocating data, (ii) the public key of the specific issuer, and (iii) the signature value of the specific issuer, and providing a PrivTxid representing location information of the voucher-revocating transaction on the private blockchain network to the specific issuer.

As one example, the specific revocating data further includes at least one of (i) information on a type of the specific electronic voucher, (ii) the public key of the specific issuer, (iii) value information, to be revoked, of the specific electronic voucher, and (iv) unique ID information of the specific issuer.

In accordance with still yet another aspect of the present disclosure, there is provided a server for issuing at least one specific electronic voucher by at least one specific issuer, including: at least one memory that stores instructions; and at least one processor configured to execute the instructions to: perform processes of (I) if (i) specific issuing data, (ii) a public key of the specific issuer, and (iii) a signature value of the specific issuer generated by signing a voucher function value of the specific issuing data or a value including the voucher function value with a private key of the specific issuer, are acquired, performing or supporting another device to perform a process of determining each of validities of (i) the specific issuing data, (ii) the public key of the specific issuer, and (iii) the signature value of the specific issuer, and (II) if each of the validities is confirmed, performing or supporting another device to perform processes of (II-1) registering in a public blockchain network a first function value of (i) the specific issuing data, (ii) the public key of the specific issuer, and (iii) the signature value of the specific issuer, and (II-2) acquiring a first transaction ID representing a location of the first function value on the public blockchain network.

As one example, at the process of (II), the processor performs or supports another device to perform processes of registering in a private blockchain network a voucher-issuing transaction including (i) the specific issuing data, (ii) the public key of the specific issuer, and (iii) the signature value of the specific issuer, and providing a PrivTxid representing a location of the voucher-issuing transaction on the private blockchain network to the specific issuer.

As one example, before the process of (I), the processor further executes the instructions to perform or support another device to perform processes of: (I01) if a request for registration of the specific issuer with the public key of the specific issuer is acquired, determining whether the specific issuer is valid, and transmitting a random nonce to the specific issuer who is determined as valid, and (I02) if a signature value of the random nonce generated by signing the random nonce with the private key of the specific issuer is acquired, (i) verifying whether the signature value of the random nonce is legitimately signed, by using the public key of the specific issuer, (ii) registering a second function value of (ii-1) the random nonce, (ii-2) the signature value of the random nonce, and (ii-3) the public key of the specific issuer, in the public blockchain network, and (iii) acquiring a second transaction ID representing a location of the second function value on the public blockchain network.

As one example, at the process of (I02), the processor performs or supports another device to perform processes of registering in a private blockchain network an issuer-registering transaction including (i) the random nonce, (ii) the signature value of the random nonce, and (iii) the public key of the specific issuer, and providing a PrivTxid representing a location of the issuer-registering transaction on the private blockchain network to the specific issuer.

In accordance with still yet another aspect of the present disclosure, there is provided a server for using at least one specific electronic voucher by at least one specific user, including: at least one memory that stores instructions; and at least one processor configured to execute the instructions to: perform processes of (I) if (i) specific usage data including a PrivTxid corresponding to the specific electronic voucher with partly unused amount beforehand, (ii) a public key of the specific user, and (iii) a signature value of the specific user generated by signing a voucher function value of the specific usage data or a value including the voucher function value with a private key of the specific user, are acquired, performing or supporting another device to perform a process of determining each of validities of (i) the specific usage data, (ii) the public key of the specific user, and (iii) the signature value of the specific user, and (II) the processor, if each of the validities is confirmed, performing or supporting another device to perform processes of (II-1) registering in a public blockchain network a first function value of (i) the specific usage data, (ii) the public key of the specific user, and (iii) the signature value of the specific user, and (II-2) acquiring a first transaction ID representing a location of the first function value on the public blockchain network.

As one example, at the process of (II), the processor performs or supports another device to perform processes of registering in a private blockchain network a voucher-using transaction including (i) the specific usage data, (ii) the public key of the specific user, and (iii) the signature value of the specific user, and providing a PrivTxid representing a location of the voucher-using transaction on the private blockchain network to the specific user.

As one example, before the process of (I), the processor further executes the instructions to perform or support another device to perform processes of: (I01) if a request for registration of the specific user by using the public key of the specific user is acquired, determining if the specific user is valid, and if the specific user is determined as valid, transmitting a random nonce to the specific user, and (I02) if a signature value of the random nonce generated by signing the random nonce with the private key of the specific user is acquired, (i) verifying whether the signature value of the random nonce is legitimately signed, by using the public key of the specific user, (ii) registering a second function value of (ii-1) the random nonce, (ii-2) the signature value of the random nonce, and (ii-3) the public key of the specific user, in the public blockchain network, and (iii) acquiring a second transaction ID representing location information of the second function value on the public blockchain network.

As one example, at the process of (I02), the processor performs or supports another device to perform processes of registering in a private blockchain network a user-registering transaction including (i) the random nonce, (ii) the signature value of the random nonce, and (iii) the public key of the specific user, and providing a PrivTxid representing location information of the user-registering transaction on the private blockchain network to the specific user.

In accordance with still yet another aspect of the present disclosure, there is provided a server for refunding at least one specific electronic voucher by at least one specific user including: at least one memory that stores instructions; and at least one processor configured to execute the instructions to: perform processes of (I) if (i) specific refunding data including a PrivTxid corresponding to the specific electronic voucher expired with partly unused amount beforehand, (ii) a public key of the specific user, and (iii) a signature value of the specific user generated by signing a voucher function value of the specific refunding data or a value including the voucher function value with a private key of the specific user are acquired, performing or supporting another device to perform a process of determining each of validities of (i) the specific refunding data, (ii) the public key of the specific user, and (iii) the signature value of the specific user, and (II) if each of the validities is confirmed, performing or supporting another device to perform processes of (II-1) registering in a public blockchain network a refund function value of (i) the specific refunding data, (ii) the public key of the specific user, and (iii) the signature value of the specific user, and (II-2) acquiring a transaction ID representing location information of the refund function value registered at the process of (II-1) on the public blockchain network.

As one example, at the process of (II), the processor performs or supports another device to perform processes of registering in a private blockchain network a voucher-refunding transaction including (i) the specific refunding data, (ii) the public key of the specific user, and (iii) the signature value of the specific user, and providing a PrivTxid representing location information of the voucher-refunding transaction on the private blockchain network to the specific user.

In accordance with still yet another aspect of the present disclosure, there is provided a server for settling one or more specific electronic vouchers by at least one specific seller, including: at least one memory that stores instructions; and at least one processor configured to execute the instructions to: perform processes of (I) if (i) specific settling data including (i-1) one or more first PrivTxids corresponding to the specific electronic vouchers with each of partly unused amounts at a time of creating a voucher-settling transaction and (i-2) the number of said one or more first PrivTxids in the voucher-settling transaction and, (ii) a public key of the specific seller, and (iii) a signature value of the specific seller generated by signing a voucher function value of the specific settling data or a value including the voucher function value with a private key of the specific seller, are acquired, performing or supporting another device to perform a process of determining each of validities of (i) the specific settling data, (ii) the public key of the specific seller, and (iii) the signature value of the specific seller, and (II) if each of the validities is confirmed, performing or supporting another device to perform processes of (II-1) registering in a public blockchain network a first function value of (i) the specific settling data, (ii) the public key of the specific seller, and (iii) the signature value of the specific seller, and (II-2) acquiring a first transaction ID representing location information of the first function value on the public blockchain network.

As one example, at the process of (II), the processor performs or supports another device to perform processes of registering in a private blockchain network the voucher-settling transaction including (i) the specific settling data, (ii) the public key of the specific seller, and (iii) the signature value of the specific seller, and providing a PrivTxid representing location information of the voucher-settling transaction on the private blockchain network to the specific seller.

As one example, before the process of (I), the processor further executes the instructions to perform or support another device to perform processes of: (I01) if a request for registration of the specific seller using the public key thereof is acquired and if the specific seller is determined as valid, transmitting or supporting another device to transmit a random nonce to the specific seller; and (I02) if a signature value of the random nonce generated by signing the random nonce with the private key of the specific seller is acquired, performing or supporting another device to perform processes of (i) verifying whether the signature value of the random nonce is legitimately signed, by using the public key of the specific seller, (ii) registering a second function value of (ii-1) the random nonce, (ii-2) the signature value of the random nonce, and (ii-3) the public key of the specific seller, in the public blockchain network, and (iii) acquiring a second transaction ID representing location information of the second function value on the public blockchain network.

As one example, at the process of (I02), the processor performs or supports another device to perform processes of registering in a private blockchain network a seller-registering transaction including (i) the random nonce, (ii) the signature value of the random nonce, and (iii) the public key of the specific seller, and providing a second PrivTxid representing location information of the seller-registering transaction on the private blockchain network to the specific seller.

In accordance with still yet another aspect of the present disclosure, there is provided a server for revoking at least one specific electronic voucher by at least one specific issuer including: at least one memory that stores instructions; and at least one processor configured to execute the instructions to: perform processes of (I) (i) specific revocating data including a PrivTxid corresponding to the specific electronic voucher expired with partly unused amount beforehand, (ii) a public key of the specific issuer, and (iii) a signature value of the specific issuer generated by signing a voucher function value of the specific revocating data or a value including the voucher function value with a private key of the specific issuer are acquired, performing or supporting another device to perform a process of determining each of validities of (i) the specific revocating data, (ii) the public key of the specific issuer, and (iii) the signature value of the specific issuer, and (II) if each of the validities is confirmed, performing or supporting another device to perform processes of (II-1) registering in a public blockchain network a revocation function value of (i) the specific revocating data, (ii) the public key of the specific issuer, and (iii) the signature value of the specific issuer, and (II-2) acquiring a transaction ID representing location information of the revocation function value on the public blockchain network.

As one example, at the process of (II), the processor performs or supports another device to perform processes of registering in a private blockchain network a voucher-revocating transaction including (i) the specific revocating data, (ii) the public key of the specific issuer, and (iii) the signature value of the specific issuer, and providing a PrivTxid representing location information of the voucher-revocating transaction on the private blockchain network to the specific issuer.

Further, in accordance with one example embodiment of the present disclosure, a server for performing methods mentioned above is provided.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
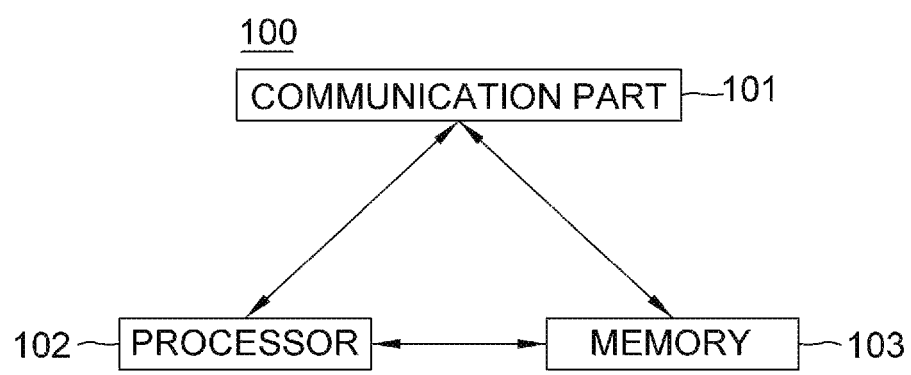
FIG. 1 is a drawing schematically illustrating a server issuing an electronic voucher in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Herein, a private blockchain network may include a private blockchain database, and a public blockchain network may include a public blockchain database, but the scope of the present disclosure is not limited thereto.

To allow those skilled in the art to the present disclosure to be carried out easily, the example embodiments of the present disclosure by referring to attached diagrams will be explained in detail as shown below. Throughout the present disclosure, every processor, every memory, every storage, or any other computing components are described as separate components, however, said every processor, said every memory, said every storage, or said any other computing components may be configured as a single device or any other combinations thereof. Also, a specific function used in the present disclosure may be a hashing function, and a function value, e.g., a voucher function value, may be a hash value generated by using the hashing function, but the scope of the present disclosure is not limited thereto.

FIG. 1 is a drawing schematically illustrating a server 100 issuing an electronic voucher, and the server 100 may include a communication part 101, a processor 102 for performing processes to issue, use, refund, settle and revocate electronic vouchers corresponding to instructions in a memory 103, and the memory 103 for storing the instructions to issue, use, refund, settle and revocate the electronic vouchers, in accordance with one example embodiment of the present disclosure. Identical reference numerals are provided for convenience of explanation but not intended for representing sameness of separate devices. Further, in accordance with another example embodiment of the present disclosure, the method may be performed by the server 100 or another server with a different configuration.

The server 100 typically achieves a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The communication part 101 of such devices may transmit requests to and receive responses from other linked devices. As one example, such requests and responses may be carried out by the same TCP session, but the scope of the present disclosure is not limited thereto. For example, they could be transmitted and received as UDP datagrams.

The processor 102 of such devices may include hardware configuration of MPU (Micro Processing Unit) or CPU (Central Processing Unit), cache memory, data bus, etc. Additionally, any OS and software configuration of applications that achieve specific purposes may be further included.

Further, the electronic voucher in accordance with the present disclosure, such as coupons, gift certificates, and prize tickets, may represent information on tangible/intangible value including at least one of a useable amount or issued amount of money, remaining use count, and exchangeable prize information, and may also represent information including any type of electronic files having the value information.

Figure 2:
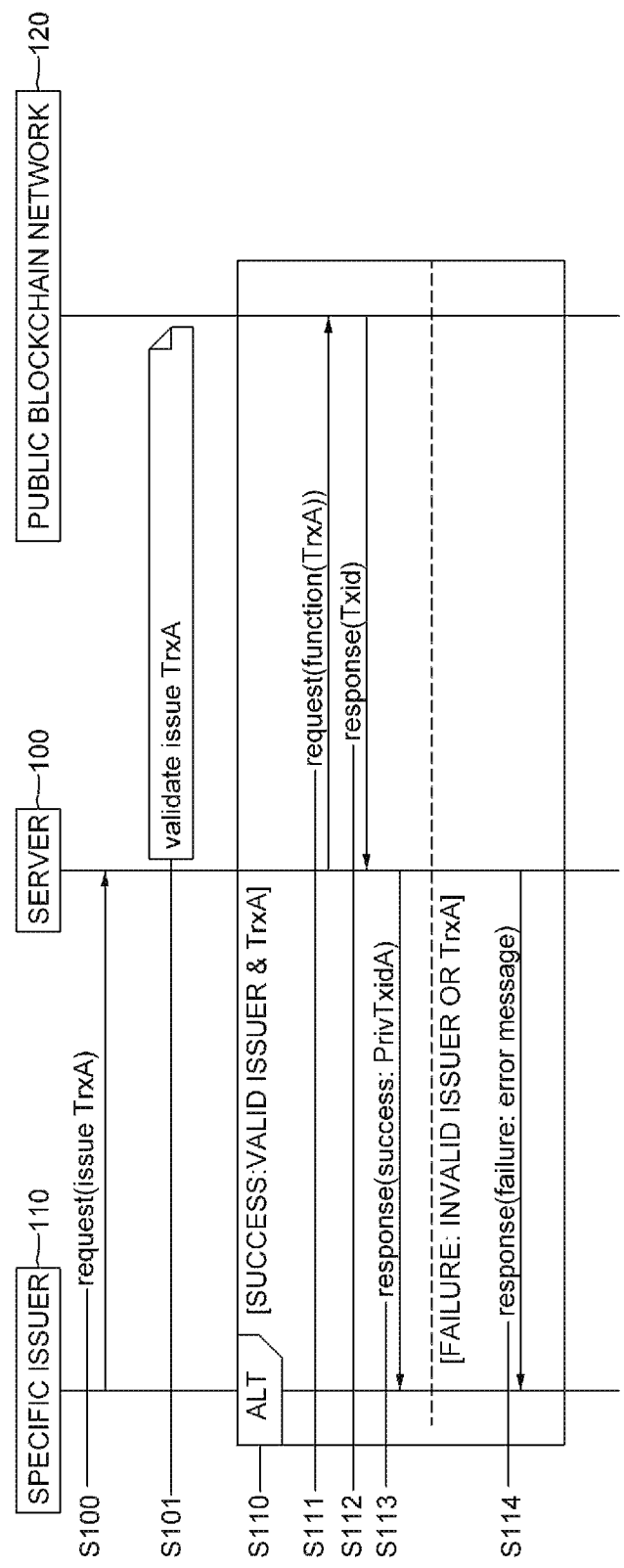
FIG. 2 is a drawing schematically illustrating a method of issuing the electronic voucher in accordance with one example embodiment of the present disclosure.

First, by referring to the server in FIG. 1, a method of issuing the electronic voucher by referring to FIG. 2 in accordance with one example embodiment of the present disclosure is described as follows.

The server 100 may acquire or support another device to acquire a request, i.e., request(issue TrxA), for issuing the electronic voucher, from a specific issuer via the communication part 101, including (i) specific issuing data, (ii) a public key of the specific issuer, and (iii) a signature value of the specific issuer generated by signing a voucher function value of the specific issuing data or a value including the voucher function value of the specific issuing data with a private key of the specific issuer, at a step of S100.

Herein the specific issuing data may include at least part of (i) information on a type of the electronic voucher, (ii) a public key of a specific user who is a buyer of the electronic voucher, (iii) issuance value information of the electronic voucher, (iv) unique ID information of the specific issuer, and (v) information on an expiration date of the electronic voucher. Herein, the information on the type of the electronic voucher may be for defining a certain process performed related to the electronic voucher and may indicate issuing of the electronic voucher. Further, the public key of the specific user who purchases the electronic voucher may be used for identification of the specific user. As another example, the electronic voucher may be used as money or a bearer gift certificate by not identifying its user. The issuance value information of the electronic voucher may represent information on tangible/intangible value including a useable amount or issued amount of money, remaining use count, exchangeable prize information, etc. Further, the unique ID information of the specific issuer may be information for identification of the specific issuer, for example, the voucher function value of the public key of the specific issuer or a value including the voucher function value of the public key of the specific issuer. Also, information on the specific issuer or on the specific user may be recorded in the server 100 in advance or at an appropriate time as the need may be, and may include at least one public key of the specific issuer or the specific user, which is recorded in the server 100. Its details will be explained in other processes. Further, the expiration date of the electronic voucher may include a date after which the electronic voucher can no longer be used.

As one example, a voucher-transaction TrxA for issuing the electronic voucher may include 1. a type (issuing), 2. a PrivTxid or a Txid of a previous transaction (not applicable to the embodiment of issuing), 3. the public key PubA of the specific user who is a receiver purchasing the electronic voucher, 4. the issuance value information of the electronic voucher, 5. an issuer ID of the electronic voucher, 6. the expiration date of the electronic voucher, 7. the public key MPubA of the specific issuer, and 8. a signature value SigMPrivA(1:2:3:4:5:6:7) of 1, 2, 3, 4, 5, 6, and 7 signed with the private key of the specific issuer.

Then, at a step of S101, the server 100 may determine whether (i) the specific issuing data, (ii) the public key of the specific issuer, and (iii) the signature value of the specific issuer, acquired through the communication part 101, are valid. Further, the server 100 may determine whether the format of the specific issuing data is valid.

Herein, the processor 101 of the server 100 may determine whether the specific issuing data is valid by comparing the voucher function value generated by applying a specific function to the specific issuing data and a value acquired by applying the public key of the specific issuer to the signature value of the specific issuer.

As one example, the signature value of the specific issuer may be validated by using the public key registered by the specific issuer.

In other words, the server 100 may perform or support another device to perform processes of (i) generating the voucher function value by applying the specific function to the specific issuing data acquired by using the registered public key of the specific issuer, (ii) comparing it with a value acquired by applying the registered public key of the specific issuer to the signature value of the specific issuer, and (iii) determining whether the specific issuing data is signed by the specific issuer and whether the specific issuing data is valid.

If the specific issuing data is determined as valid at a step of S110, the server 100 may perform or support another device to perform processes of recording the voucher-issuing transaction TrxA of the electronic voucher including (i) the specific issuing data, (ii) the public key of the specific issuer, and (iii) the signature value of the specific issuer, in a private blockchain network, and notifying the specific issuer of a fact that a registration of a PrivTxid representing location information of the voucher-issuing transaction on the private blockchain network was successful, at a step of S113. However, if the specific issuing data is determined as invalid at the step of S110, the server 100 may notify the specific issuer 110 of a fact that the registration failed through an error message, at a step of S114.

Also, if the specific issuing data is determined as valid, the server 100 may register or support another device to register a first function value function(TrxA) of (i) the acquired specific issuing data, (ii) the acquired public key of the specific issuer, and (iii) the acquired signature value of the specific issuer in the public blockchain network 120, at a step of S111. Specific functions used for calculating function values may include an MD4 function, an MD5 function, an SHA-0 function, an SHA-1 function, an SHA-224 function, an SHA-256 function, an SHA-384 function, an SHA-512 function and an HAS-160 function, but the scope of the present disclosure is not limited thereto. For example, a Triple SHA256 function may also be included.

Thereafter, the server 100 may acquire or support another device to acquire a transaction ID Txid representing location information of the first function value function(TrxA) registered on the public blockchain network 120, at a step of S112. Further, the server 100 may retrieve an OP message corresponding to the Txid from the public blockchain network 120.

Although the server 100 is described above as registering the voucher-issuing transaction of the specific issuer by using the private blockchain network and the public blockchain network, the server 100 may use the public blockchain network only as the case may be.

That is, the server 100 may perform or support another device to perform processes of registering the valid voucher-issuing transaction TrxA in the public blockchain network, acquiring the transaction ID Txid which represents the location of registration of the voucher-issuing transaction TrxA, and transmitting the acquired transaction ID to the specific issuer.

Figure 3:
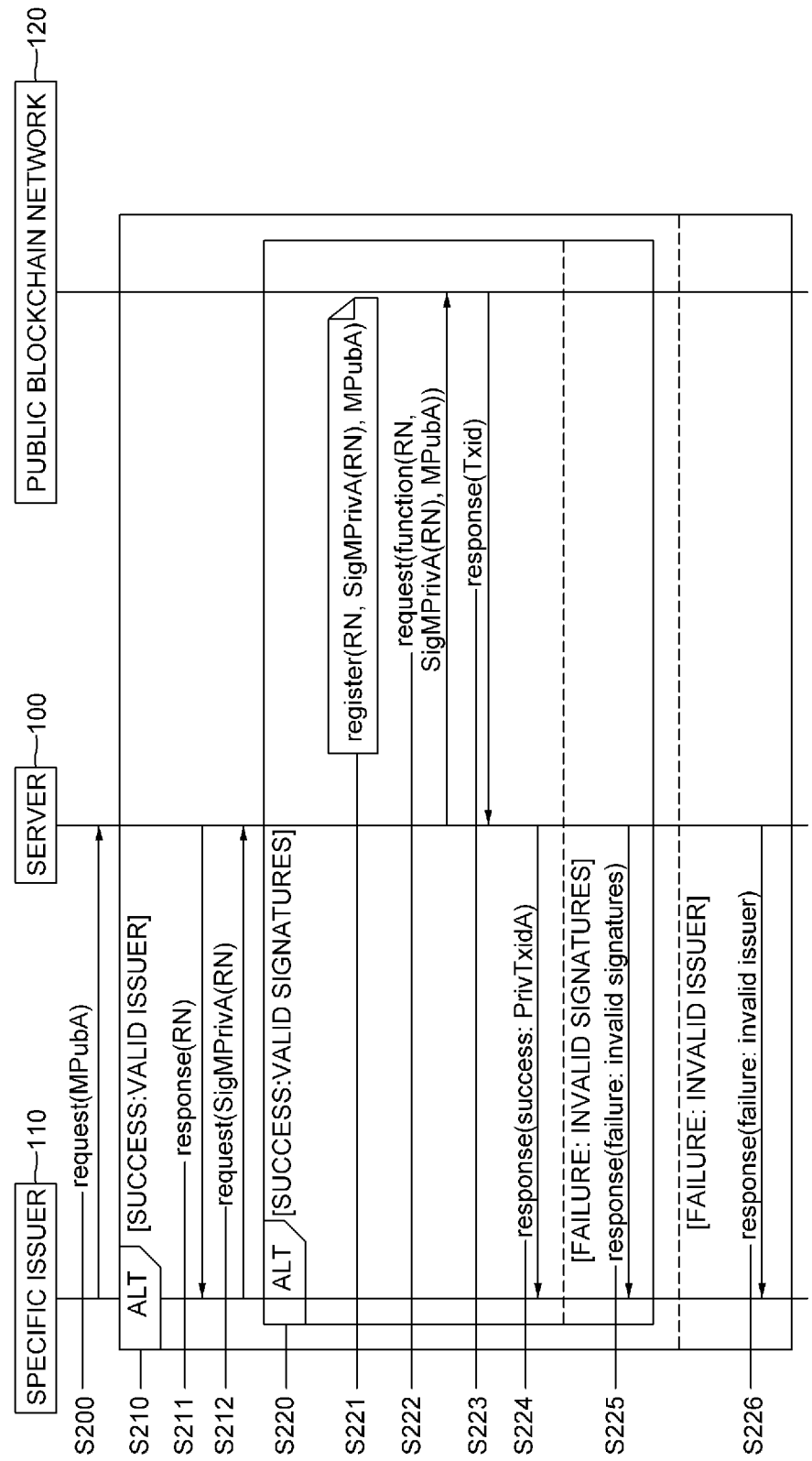
FIG. 3 is a drawing schematically illustrating a method of registering a specific issuer of the electronic voucher in accordance with one example embodiment of the present disclosure.

Next, by referring to FIG. 3, a process of registering the specific issuer 110 is described as follows.

If a request for registration of the specific issuer 110 using the public key MPubA thereof is acquired at a step of S200, the server 100 may perform or support another device to perform processes of determining whether the specific issuer 110 is valid at a step of S210, and if the specific issuer 110 is determined as valid, transmitting a random nonce RN to the specific issuer 110 at a step of S211. If the specific issuer 110 is determined as invalid, for example, if the specific issuer is an illegal issuer, the server 100 may notify or support another device to notify the specific issuer 110 of a fact that a confirmation of the specific issuer failed, at a step of S226.

Specifically, on condition that the specific issuer 110 has created the private key MPrivA and the public key MPubA using a user device, if the public key of the specific issuer is transmitted to the server 100 for registering the specific issuer 110 as an issuer of the electronic voucher, the server 100 may determine whether the specific issuer 110 who is an owner of the acquired public key is valid. Herein, the specific issuer 110 may be validated by using a PKI based certificate or identification information on the specific issuer, but the scope of the present disclosure is not limited thereto. As one example, the specific issuer may be confirmed by a public key certificate based on the PKI, an OPSign certificate, or the identification information that can confirm an identity of a person, like an SSN or a passport.

Thereafter, if a signature value SigMPrivA(RN) generated by signing a random nonce with the private key of the specific issuer is acquired at a step of S212, the server 100 may verify that the signature value of the random nonce is legitimately signed, by applying the public key of the specific issuer to the signature value, at a step of S220. In other words, the server 100 may confirm the random nonce from the SigMPrivA(RN) which is a signature value acquired by using the public key of the specific issuer, and if the confirmed random nonce is identical to the random nonce transmitted to the specific issuer, then may determine the signature as valid.

Further, if the signature value acquired from the specific issuer 110 is determined as valid, the server 100 may perform or support another device to perform processes of recording an issuer-registering transaction, i.e., transaction (RN, SigMPrivA(RN), MPubA), of the specific issuer including the random nonce, the signature value of the random nonce, and the public key of the specific issuer, in the private blockchain network at a step of S221, and notifying the specific issuer of a fact that a registration of a PrivTxid representing location information of the issuer-registering transaction on the private blockchain network was successful, at a step of S224.

However, if the signature value acquired from the specific issuer 110 is determined as invalid, the server 100 may notify or support another device to notify the specific issuer 110 of a fact that a confirmation of the signature value failed, at a step of S225.

Also, if the specific issuer 110 and the signature value acquired from the specific issuer 110 are determined as valid, the server 100 may perform or support another device to perform processes of recording a second function value function(RN, SigMprivA(RN), MPubA) of (i) the random nonce, (ii) the signature value of the random nonce, and (iii) the public key of the specific issuer in the public blockchain network at a step of S222, and acquiring a transaction ID Txid representing location information of the second function value on the public blockchain network, at a step of S223.

Although the server 100 is described above as recording the issuer-registering transaction of the specific issuer by using the private blockchain network and the public blockchain network, the server 100 may use the public blockchain network only.

That is, if the specific issuer 110 and the signature value acquired from the specific issuer 110 are determined as valid, the server 100 may perform or support another device to perform processes of recording the issuer-registering transaction, i.e., transaction(RN, SigMprivA(RN), MPubA), in the public blockchain network, acquiring the ID Txid which represents a location of registration of the issuer-registering transaction TrxA on the public blockchain network, and transmitting the acquired transaction ID Txid to the specific issuer.

Figure 4:
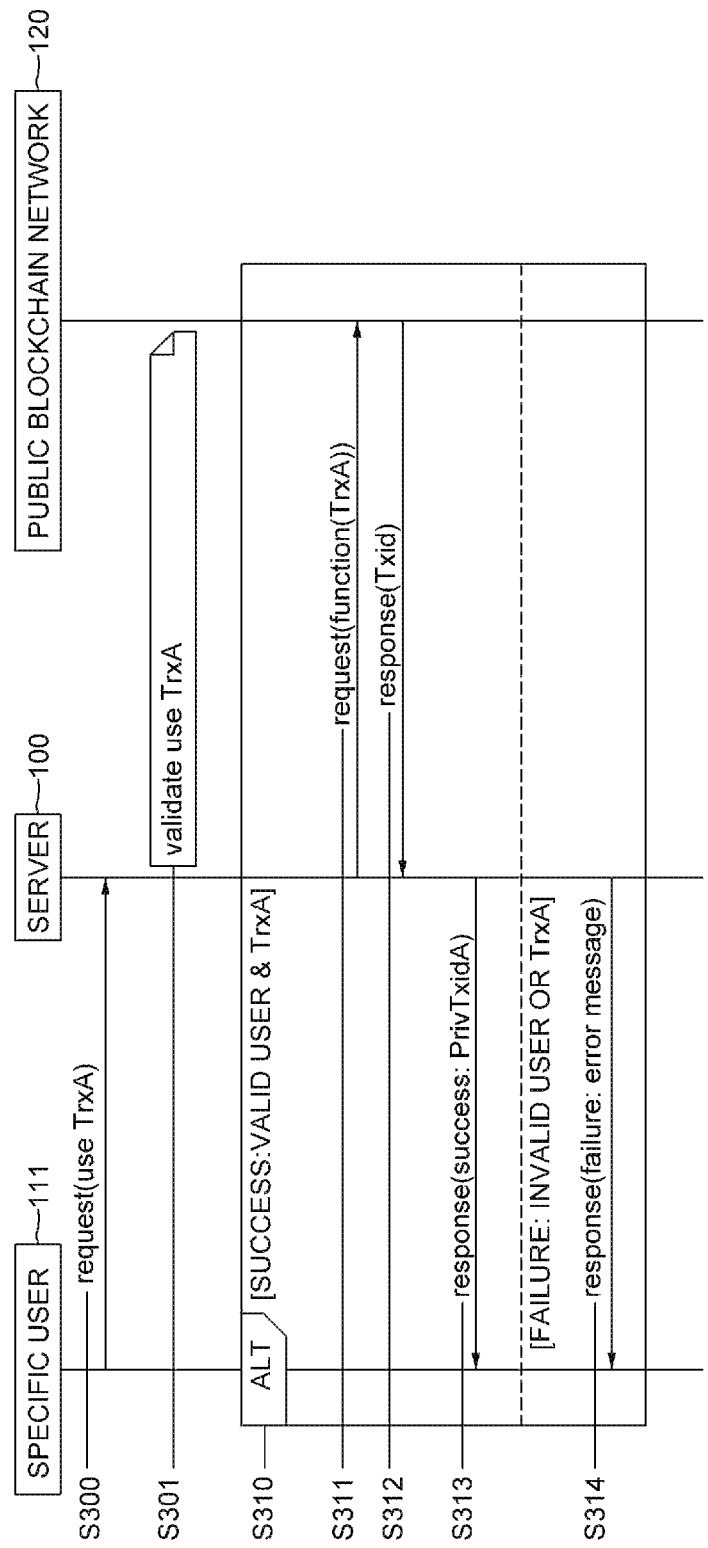
FIG. 4 is a drawing schematically illustrating a method of using the electronic voucher in accordance with one example embodiment of the present disclosure.

Next, by referring to FIG. 4, a method of using the electronic voucher in accordance with one example embodiment of the present disclosure is described as follows. A part similar to the method of issuing the electronic voucher in accordance with the present disclosure in FIG. 2 is omitted, as it is easily inferred from FIG. 2.

The server 100 may acquire through the communication part 101 a request, i.e., request(use TrxA) for using the electronic voucher transmitted from the user device of the specific user 111 who purchased the electronic voucher, including (i) specific usage data including the PrivTxid of the electronic voucher with partly unused amount beforehand, (ii) the public key of the specific user 111, and (iii) a signature value of the specific user 111 generated by signing a voucher function value of the specific usage data or a value including the voucher function value of the specific usage data with a private key of the specific user 111, at a step of S300.

Herein, the specific usage data may further include at least part of (i) the information on the type of the electronic voucher, (ii) a public key of a specific seller who is a receiver of the electronic voucher, (iii) usage value information, to be used currently, on the electronic voucher, (iv) unique ID information of the specific issuer who issued the electronic voucher, (v) the information on the expiration date of the electronic voucher, (vi) remaining value information on amount after use of the usage value information, and (vii) the public key of the specific user for confirming the remaining value information. Herein, the information on the type of the electronic voucher is for defining a certain process to be performed in relation to the electronic voucher and may indicate usage of the electronic voucher. Further, the public key of the specific seller who receives the electronic voucher may be used for identification of the specific seller who accepts the electronic voucher used by the specific user, via designating the specific seller. As another example, the electronic voucher may be used as money or a bearer gift certificate by not identifying its seller. The usage value information among the value information of the electronic voucher, to be used currently, may represent information on tangible/intangible value including a useable amount or issued amount of money, remaining use count, exchangeable prize information, etc. Further, the unique ID information of the specific issuer may include identification information of the specific issuer, for example, a function value of the public key of the issuer or a value including the function value of the public key of the issuer. Further, the expiration date of the electronic voucher may include the date after which the electronic voucher can no longer be used. Also, the remaining value information representing the amount remained after use of the usage value information may be information on amount of balance after use of the electronic voucher, and the public key of the specific user for confirming the remaining value information may be information for confirming ownership of the amount of balance after the use of the electronic voucher. Herein, if the electronic voucher does not have any remaining value, the remaining value information and the public key of the specific user for confirming the remaining value information may be absent.

As one example, a voucher-using transaction TrxA for using the electronic voucher may include 1. a type (using), 2. the PrivTxid or the Txid of a previous transaction, 3. the public key of the specific seller who is a receiver of the electronic voucher, 4. the usage value information of the electronic voucher, 5. the issuer ID of the electronic voucher, 6. the expiration date of the electronic voucher, 7. the remaining value information of the electronic voucher, 8. the public key of the specific user for confirming ownership of the remaining value of the electronic voucher, 9. the public key PubA of the specific user, and 10. a signature value SigMPrivA(1:2:3:4:5:6:7:8:9) of 1, 2, 3, 4, 5, 6, 7, 8, and 9 signed with the private key of the specific user.

Then, the server 100 may determine whether (i) the acquired specific usage data, (ii) the acquired public key of the specific user, and (iii) the acquired signature value of the specific user are valid, at a step of S301. Further, the server 100 may determine whether the format of the specific usage data is valid.

And if (i) the acquired specific usage data, (ii) the acquired public key of the specific user, and (iii) the acquired signature value of the specific user are determined as valid at a step of S310, the server 100 may perform or support another device to perform processes of recording the voucher-using transaction TrxA including (i) the specific usage data, (ii) the public key of the specific user, and (iii) the signature value of the specific user, in the private blockchain network, and notifying the specific user of a fact that a registration including a PrivTxid which represents location information of the voucher-using transaction on the private blockchain network was successful, at a step of S313. However, if at least one of the specific usage data, the public key of the specific user, and the signature value of the specific user is determined as invalid at the step of S110, the server 100 may notify or support another device to notify the specific user 111 of a fact that a registration failed through an error message, at a step of S314.

Also, if the specific usage data, the public key of the specific user, and the signature value of the specific user are determined as valid, the server 100 may register or support another device to register a first function value of (i) the specific usage data, (ii) the public key of the specific user, and (iii) the signature value of the specific user in the public blockchain network, at a step of S311.

Thereafter, the server 100 may acquire or support another device to acquire a transaction ID Txid representing location information of the first function value on the public blockchain network, at a step of S312. Further, the server 100 may retrieve an OP message corresponding to the Txid from the public blockchain network 120.

Although the server 100 is described above as registering the voucher-using transaction of the specific user by using the private blockchain network and the public blockchain network, the server 100 may use the public blockchain network only.

That is, the server 100 may perform or support another device to perform processes of registering the valid voucher-using transaction TrxA in the public blockchain network, acquiring the transaction ID Txid which represents the location of registration of the voucher-using transaction TrxA, and transmitting the acquired transaction ID to the specific issuer. Herein, the PrivTxid described above, i.e., the PrivTxid of the electronic voucher partly unused beforehand in the voucher-using transaction, may be replaceable with the Txid, i.e., the ID of the transaction of the electronic voucher partly unused beforehand registered in the public blockchain network.

Next, a process of the server 100 registering the specific user is described as follows. The process of registering the specific user is similar to the process of registering the specific issuer as in FIG. 3, and thus the explanation thereon is omitted.

If a request for registration of the specific user 111 using the public key thereof is acquired, the server 100 may perform or support another device to perform processes of determining whether the specific user 111 is valid, and if the specific user 111 is determined as valid, then transmitting a random nonce to the specific user 111. If the specific user 111 is determined as invalid, the server 100 may notify or support another device to notify the specific user 111 of a fact that a confirmation of the specific user failed.

Thereafter, if a signature value generated by signing the random nonce with the private key of the specific user is acquired, the server 100 may verify that the signature value of the random nonce is legitimately signed, by applying the public key of the specific user to the signature value.

Further, if the signature value acquired from the specific user 111 is determined as valid, the server 100 may perform or support another device to perform processes of recording a user-registering transaction of the specific user, including (i) the random nonce, (ii) the signature value of the random nonce, and (iii) the public key of the specific user, in the private blockchain network, and providing a PrivTxid which represents location information of the user-registering transaction on the private blockchain network to the specific user 111.

However, the server 100, if the signature value acquired from the specific user 111 is determined as invalid, may notify or support another device to notify the specific user 111 of a fact that a confirmation of the signature value failed.

Also, if the specific issuer 110 and the signature value acquired from the specific issuer 110 are determined as valid, the server 100 may perform or support another device to perform processes of recording a second function value of (i) the random nonce, (ii) the signature value of the random nonce, and (iii) the public key of the specific user in the public blockchain network, and acquiring a transaction ID Txid representing location information of the second function value on the public blockchain network.

Although the server 100 is described above as recording the user-registering transaction of the specific user by using the private blockchain network and the public blockchain network, the server 100 may use the public blockchain network only.

That is, if the specific user and the signature value of the specific user are determined as valid, the server 100 may perform or support another device to perform processes of recording the user-registering transaction in the public blockchain network, acquiring the ID Txid, which represents location information of the user-registering transaction TrxA on the public blockchain network, and transmitting the acquired transaction ID Txid to the specific user.

Figure 5:
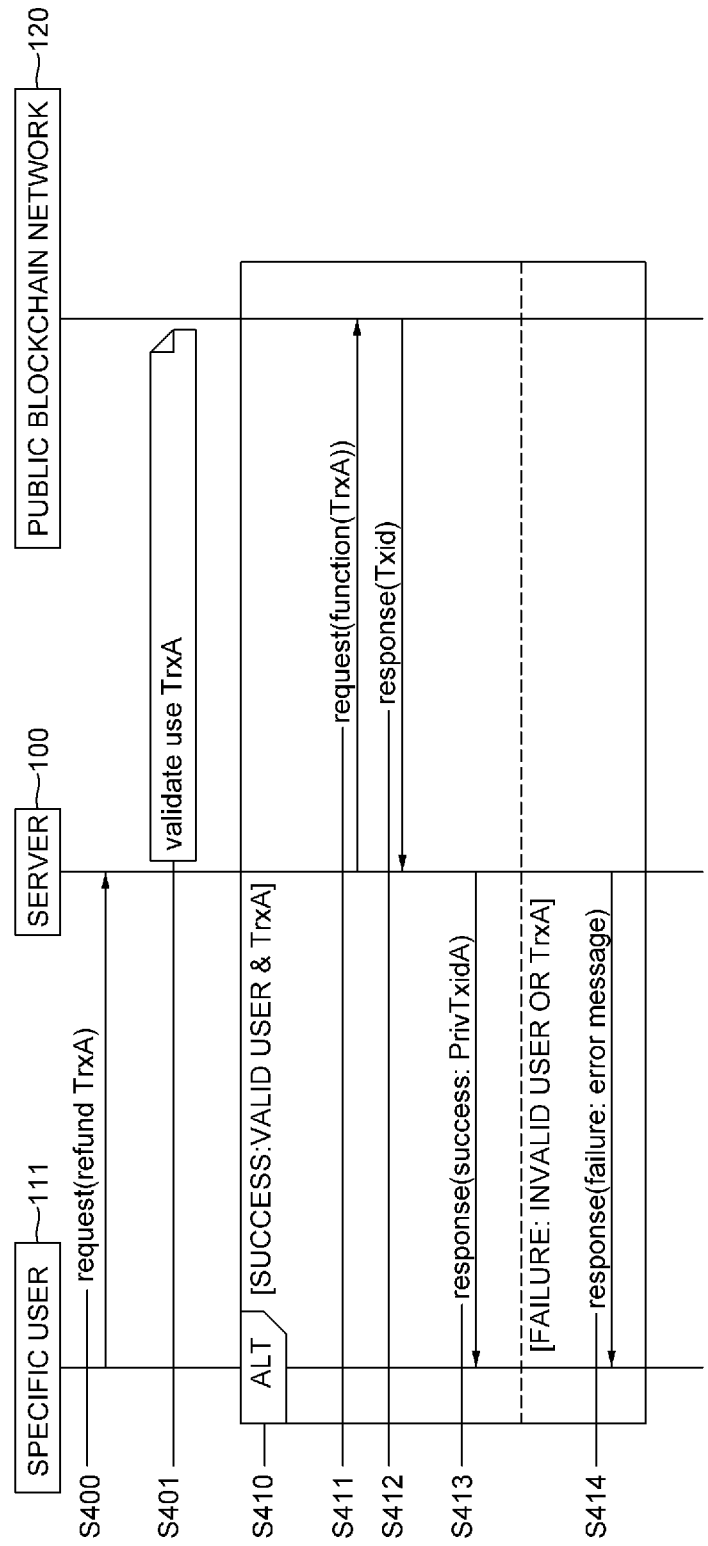
FIG. 5 is a drawing schematically illustrating a method of refunding the electronic voucher in accordance with one example embodiment of the present disclosure.

Next, by referring to FIG. 5, a method of refunding the electronic voucher in accordance with one example embodiment of the present disclosure is described as follows. A part of the following description similar to the method of issuing the electronic voucher in accordance with the present disclosure in FIG. 2 is omitted, as it is easily inferred from FIG. 2.

The server 100 may acquire through the communication part a request, i.e., request(refund TrxA) for refunding the electronic voucher transmitted from the user device of the specific user 111 who purchased the electronic voucher, including (i) specific refunding data including a PrivTxid of an expired electronic voucher with partly unused amount beforehand, (ii) the public key of the specific user 111, and (iii) a signature value of the specific user 111 generated by signing a voucher function value of the specific refunding data or a value including the voucher function value of the specific refunding data with the private key of the specific user 111, at a step of S400.

Herein the specific refunding data may include at least part of (i) the information on the type of the electronic voucher, (ii) the public key of the specific issuer of the electronic voucher, (iii) refund value information of the electronic voucher, (iv) the unique ID information of the specific issuer, and (v) the information on the expiration date of the electronic voucher. Herein, the information on the type of the electronic voucher is for defining a certain process to be performed in relation to the electronic voucher and may indicate refund of the electronic voucher. Further, the public key of the specific issuer may be the public key of the specific issuer as a receiver of the electronic voucher to be refunded. Also, the refund value information of the electronic voucher may be information on its value that can be refunded using the electronic voucher, and the unique ID information of the specific issuer may be an ID of the specific issuer of the electronic voucher. Further, the expiration date of the electronic voucher may include the date after which the electronic voucher can no longer be used.

As one example, a voucher-refunding transaction TrxA for refunding the electronic voucher may include 1. a type (refunding), 2. the PrivTxid or the Txid of a previous transaction, 3. the public key of the specific issuer who is a receiver of the electronic voucher to be refunded, 4. the refund value information of the electronic voucher, 5. the issuer ID of the electronic voucher, 6. the expiration date of the electronic voucher, 7. the public key PubA of the specific user, and 8. a signature value SigPrivA(1:2:3:4:5:6:7) of 1, 2, 3, 4, 5, 6, and 7 signed with the private key of the specific issuer.

Then, the server 100 may determine whether (i) the acquired specific refunding data, (ii) the acquired public key of the specific user, and (iii) the acquired signature value of the specific user are valid, at a step of S401.

And if (i) the acquired specific refunding data, (ii) the acquired public key of the specific user, and (iii) the acquired signature value of the specific user are determined as valid at a step of S410, the server 100 may perform or support another device to perform processes of recording the voucher-refunding transaction TrxA for the electronic voucher including (i) the specific refunding data, (ii) the public key of the specific user, and (iii) the signature value of the specific user, in the private blockchain network, and notifying the specific user 111 of a fact that a registration including the PrivTxid which represents location information of the voucher-refunding transaction on the private blockchain network was successful, at a step of S413. However, if the specific refunding data is determined as invalid at a step of S410, the server 100 may notify or support another device to notify the specific user 111 of a fact that the registration failed through an error message, at a step of S414.

Also, if the specific refunding data, the public key of the specific user, and the signature value of the specific user are determined as valid, the server 100 may register or support another device to register a refund function value of (i) the specific refunding data, (ii) the public key of the specific user, and (iii) the signature value of the specific user in the public blockchain network, at a step of S411.

Thereafter, the server 100 may acquire or support another device to acquire a transaction ID Txid representing location information of the refund function value on the public blockchain network 120, at a step of S412. Further, the server 100 may retrieve an OP message corresponding to the Txid from the public blockchain network 120.

Although the server 100 is described above as registering the voucher-refunding transaction of the specific user by using the private blockchain network and the public blockchain network, the server 100 may use the public blockchain network only.

That is, the server 100 may perform or support another device to perform processes of registering the valid voucher-refunding transaction TrxA in the public blockchain network 120, acquiring the transaction ID Txid which represents the location of registration of the voucher-refunding transaction TrxA, and transmitting the acquired transaction ID to the specific user. Herein, the PrivTxid described above, i.e., the PrivTxid of the expired electronic voucher partly unused beforehand in the voucher-using transaction, may be replaceable with the Txid, i.e., the ID of the transaction of the expired electronic voucher partly unused beforehand registered in the public blockchain network.

Figure 6:
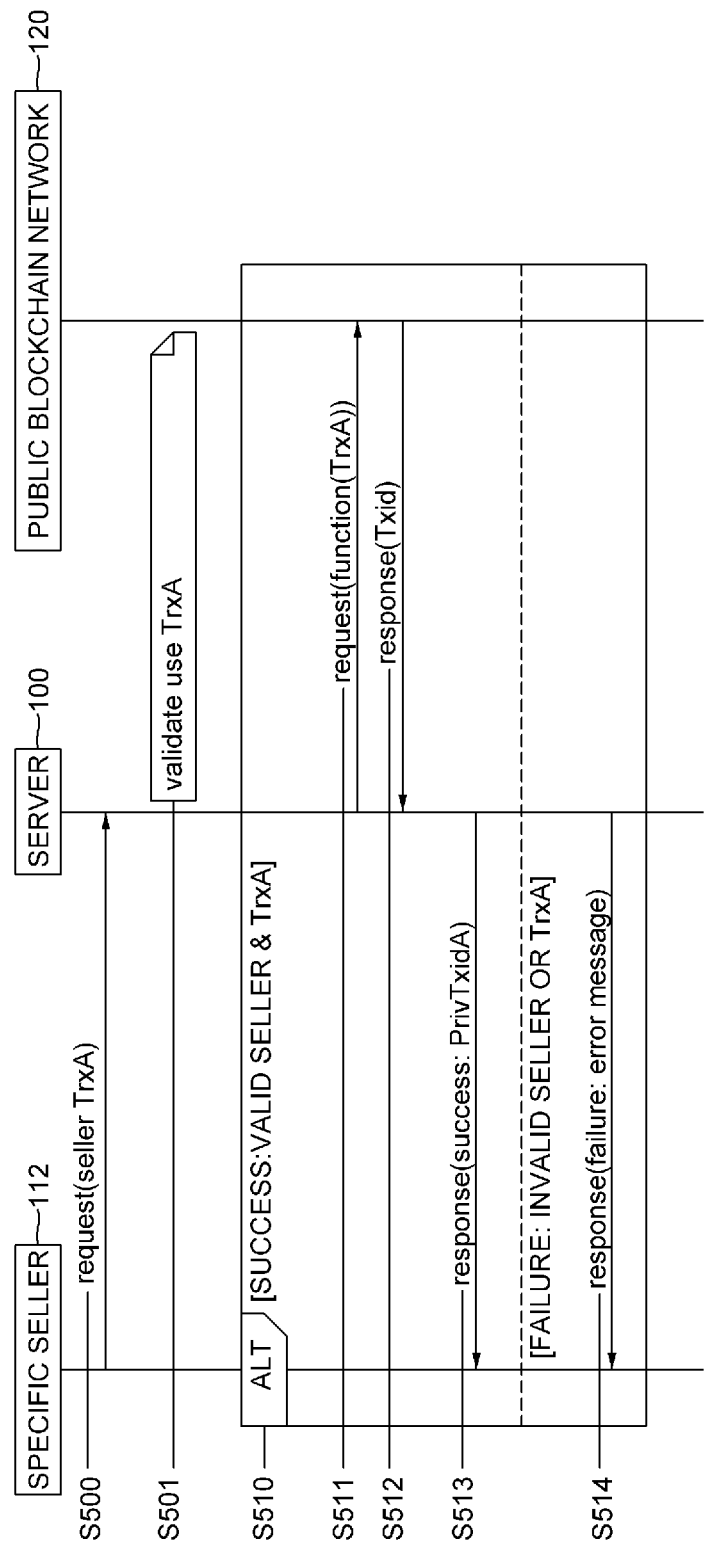
FIG. 6 is a drawing schematically illustrating a method of settling the electronic voucher in accordance with one example embodiment of the present disclosure.

Next, by referring to FIG. 6, a method of settling the electronic voucher in accordance with one example embodiment of the present disclosure is described as follows. A part of the following description similar to the method of issuing the electronic voucher in accordance with the present disclosure in FIG. 2 is omitted, as it is easily inferred from FIG. 2.

The server 100 may receive through the communication part a request, i.e., request(seller TrxA), for settling the electronic voucher transmitted from the user device of a specific seller 112 who received the electronic voucher for a return service such as goods and services, including (i) specific settling data having (i-1) one or more PrivTxids corresponding to specific electronic vouchers with each of partly unused amounts at a time of creating a voucher-settling transaction and (i-2) the number of said one or more PrivTxids in the voucher-settling transaction, (ii) the public key of the specific seller, and (iii) a signature value of the specific seller generated by signing a voucher function value of the specific settling data or a value including the voucher function value with a private key of the specific seller, at a step of S500.

Herein, the specific settling data may include at least part of (i) the information on the type of the electronic voucher, (ii) the public key of the specific issuer of the electronic voucher, (iii) settling value information of the electronic voucher, (iv) the unique ID information of the specific issuer, and (v) the information on the expiration date of the electronic voucher. Herein, the information on the type of the electronic voucher is for defining a certain process to be performed in relation to the electronic voucher and may indicate settling of the electronic voucher. Further, the settling value information of the electronic voucher may be information on a value received by the specific seller as a return service such as goods and services.

As one example, the voucher-settling transaction TrxA for settling the electronic voucher may include 1. a type (settling), 2. the PrivTxids or the Txids corresponding to the electronic vouchers with each of partly unused amounts at the time of creating the voucher-settling transaction, 3. the number of the PrivTxids, 4. the public key of the specific issuer who is a receiver of the electronic voucher to be settled, 5. the settling value information of the electronic voucher, 6. the issuer ID of the electronic voucher, 7. the public key PubA of the specific seller, and 8. a signature value SigPrivA(1:2:3:4:5:6:7) of 1, 2, 3, 4, 5, 6, and 7 signed with the private key of the specific seller.

Then, the server 100 may determine whether (i) the acquired specific settling data, (ii) the acquired public key of the specific seller, and (iii) the acquired signature value of the specific seller are valid, at a step of S501. Further, the server 100 may determine whether the format of the specific settling data is valid.

And if the specific settling data, the public key of the specific seller, and the signature value of the specific seller are determined as valid at a step of S500, the server 100 may perform or support another device to perform processes of registering the voucher-settling transaction, i.e., the voucher-settling transaction(TrxA) for the electronic voucher, including (i) the specific settling data, (ii) the public key of the specific seller, and (iii) the signature value of the specific seller in the private blockchain network, and providing the specific seller 112 with a PrivTxid which represents location information of the recorded voucher-settling transaction on the private blockchain network, at step of S514.

Also, if the specific settling data, the public key of the specific seller, and the signature value of the specific seller are determined as valid, the server 100 may register or support another device to register a first function value of (i) the specific settling data, (ii) the public key of the specific seller, and (iii) the signature value of the specific seller in the public blockchain network, at a step of S511.

Thereafter, the server 100 may acquire or support another device to acquire a transaction ID Txid representing location information of the first function value on the public blockchain network 120, at a step of S512. Further, the server 100 may retrieve an OP message corresponding to the Txid from the public blockchain network 120.

Although the server 100 is described above as registering the voucher-settling transaction of the specific seller by using the private blockchain network and the public blockchain network, the server 100 may use the public blockchain network only.

That is, the server 100 may perform or support another device to perform processes of registering the valid voucher-settling transaction TrxA in the public blockchain network 120, acquiring the transaction ID Txid which represents the location of registration of the voucher-settling transaction TrxA, and transmitting the acquired transaction ID to the specific seller. Herein, (i) the number of the PrivTxids described above, i.e., the number of the PrivTxids corresponding to the electronic vouchers in the voucher-settling transaction and (ii) the PrivTxids, i.e., the PrivTxids corresponding to the electronic vouchers with each of partly unused amounts at the time of creating the voucher-settling transaction may be respectively replaceable with (iii) the number of the Txids, i.e., the number of the Txids corresponding to the electronic vouchers in the voucher-settling transaction registered in the public blockchain network, and (iv) the Txids, i.e., the Txids corresponding to the electronic vouchers partly unused at the time of creating the voucher-settling transaction.

Next, a process of the server 100 registering the specific seller is described as follows. The process of registering the specific seller is similar to the process of registering the specific issuer as in FIG. 3, and thus the explanation is omitted.

If a request for registration of the specific seller 112 using the public key thereof is acquired, the server 100 may determine whether the specific seller 112 is valid, and if the specific seller 112 is determined as valid, may transmit or support another device to transmit a random nonce to the specific seller 112. If the specific seller 112 is determined as invalid, the server 100 may notify or support another device to notify the specific seller 112 of a fact that a confirmation of the specific seller failed.

Thereafter, if the specific seller 112 is determined as valid, and if a signature value generated by signing the random nonce with the private key of the specific seller is acquired, the server 100 may verify that the signature value of the random nonce is legitimately signed, by applying the public key of the specific seller to the signature value.

Further, if the signature value acquired from the specific seller 112 is determined as valid, the server 100 may perform or support another device to perform processes of recording a seller-registering transaction of the specific seller including the random nonce, the signature value of the random nonce, and the public key of the specific seller in the private blockchain network, and providing the specific seller 112 with a PrivTxid which represents location information of the seller-registering transaction on the private blockchain network.

However, if the signature value acquired from the specific seller 112 is determined as invalid, the server 100 may notify or support another device to notify the specific seller 112 of a fact that a confirmation of the signature value failed.

Also, if the specific seller and the signature value of the specific seller are determined as valid, the server 100 may perform or support another device to perform processes of recording a second function value of (i) the random nonce, (ii) the signature value of the random nonce, and (iii) the public key of the specific seller in the public blockchain network, and acquiring a transaction ID Txid representing location information of the second function value on the public blockchain network.

Although the server 100 is described above as recording the seller-registering transaction of the specific seller by using the private blockchain network and the public blockchain network, the server 100 may use the public blockchain network only.

That is, if the specific seller and the signature value of the specific seller are determined as valid, the server 100 may perform or support another device to perform processes of recording the seller-registering transaction in the public blockchain network, acquiring the ID Txid, which represents location information of the seller-registering transaction TrxA on the public blockchain network, and transmitting the acquired transaction ID Txid to the specific seller.

Figure 7:
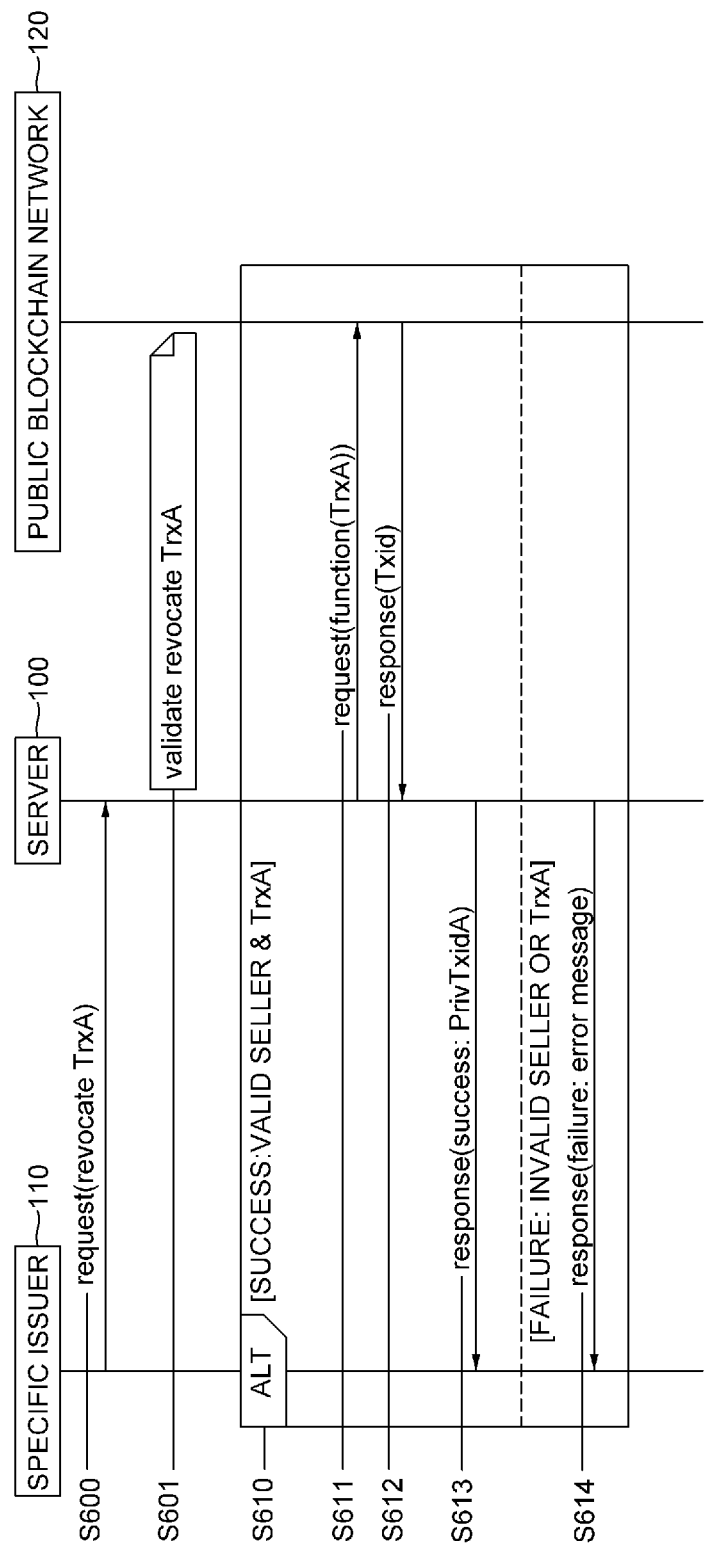
FIG. 7 is a drawing schematically illustrating a method of revocating the electronic voucher in accordance with one example embodiment of the present disclosure.

Next, by referring to FIG. 7, a method of revoking the electronic voucher in accordance with one example embodiment of the present disclosure is described as follows. A part of the following description similar to the method of issuing the electronic voucher in accordance with the present disclosure in FIG. 2 is omitted, as it is easily inferred from FIG. 2.

The server 100 may acquire through the communication part a request, i.e., request(revocate TrxA) for revoking the electronic voucher transmitted from the user device of the specific issuer, including (i) specific revocating data having a PrivTxid corresponding to an expired electronic voucher with partly unused amount beforehand, (ii) the public key of the specific issuer, and (iii) a signature value of the specific issuer generated by signing a voucher function value of the specific revocating data or a value including the voucher function value of the specific revocating data with the private key of the specific issuer, at a step of S600.

Herein, the specific revocating data may include at least part of (i) the information on the type of the electronic voucher, (ii) the public key of the specific issuer, (iii) revocating value information to be revoked from the electronic voucher, and (iv) the unique ID information of the specific issuer. Herein, the information on the type of the electronic voucher is for defining a certain process to be performed in relation to the electronic voucher and may indicate revocating of the electronic voucher.

As one example, a voucher-revocating transaction TrxA for revoking the electronic voucher may include 1. a type (revocating), 2. the PrivTxid or the Txid corresponding to the expired electronic voucher partly unused beforehand, 3. the public key of the specific issuer who is the receiver of the electronic voucher, 4. revocation value information of the electronic voucher, 5. the issuer ID of the electronic voucher, 6. the public key of the specific issuer, and 7. a signature value SigPrivA(1:2:3:4:5:6) of 1, 2, 3, 4, 5, and 6 signed with the private key of the specific issuer.

Then, the server 100 may determine whether (i) the acquired specific revocating data, (ii) the acquired public key of the specific issuer, and (iii) the acquired signature value of the specific issuer, at a step of S601. Further, the server 100 may determine whether the format of the specific revocating data is valid.

If the specific revocating data, the public key of the specific issuer, and the signature value of the specific issuer are determined as valid, the server 100 may perform or support another device to perform processes of recording the voucher-revocating transaction, i.e., the voucher-revocating transaction (TrxA) for the electronic voucher, including (i) the specific revocating data, (ii) the public key of the specific issuer, and (iii) the signature value of the specific issuer in the private blockchain network and notifying the specific issuer 110 of a fact that a registration including the PrivTxid which represents location information of the voucher-revocating transaction on the private blockchain network was successful, at a step of S613. However, if at least one of the specific revocating data, the public key of the specific issuer, and the signature value of the specific issuer is determined as invalid at a step of S610, the server 100 may notify or support another device to notify the specific issuer 110 of a fact that the registration failed through an error message, at a step of S614.

Also, if the specific revocating data, the public key of the specific issuer, and the signature value of the specific issuer are determined as valid, the server 100 may register or support another device to register a revocation function value of (i) the specific revocating data, (ii) the public key of the specific issuer, and (iii) the signature value of the specific issuer in the public blockchain network, at a step of S611.

Thereafter, the server 100 may acquire or support another device to acquire a transaction ID Txid representing location information of the revocation function value on the public blockchain network, at a step of S612. Further, the server 100 may retrieve an OP message corresponding to the Txid from the public blockchain network 120.

Although the server 100 is described above as registering the voucher-revocating transaction of the specific issuer by using the private blockchain network and the public blockchain network, the server 100 may use the public blockchain network only.

That is, the server 100 may perform or support another device to perform processes of registering the valid voucher-revocating transaction TrxA in the public blockchain network, acquiring the transaction ID Txid which represents the location of registration of the voucher-revocating transaction TrxA, and transmitting the acquired transaction ID to the specific issuer. Herein, the PrivTxid described above, i.e., the PrivTxid corresponding to the expired electronic voucher partly unused beforehand in the voucher-revocating transaction, may be replaceable with the Txid, i.e., the TxID corresponding to the expired electronic voucher partly unused beforehand registered in the public blockchain network.

The present disclosure has an effect of improving reliability and security of the electronic voucher by registering the electronic voucher in the blockchain network to prevent forgery or illegal copying.

The present disclosure has another effect of improving reliability and security of the electronic voucher by using the specific functions and cryptography to prevent forgery and illegal copying.

The present disclosure has another effect of improving reliability and security of the electronic voucher by registering the electronic voucher in the blockchain network to prevent duplicate issuance of a same electronic voucher.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for issuing at least one specific electronic voucher granting a transferrable monetary value by at least one specific issuer, comprising steps of:
    receiving from a specific issuer, at a server, a request for issuing the specific electronic voucher;
    acquiring in the request, at the server, (i) specific issuing data, (ii) a public key of the specific issuer, and (iii) a signature value of the specific issuer generated by signing the specific issuing data with a private key of the specific issuer or signing a voucher function value of the specific issuing data with the private key of the specific issuer, wherein the specific electronic voucher also has a transferrable monetary value, wherein the specific issuing data includes at least one of (i) a type of the specific electronic voucher, (ii) a public key of a specific user who is a buyer of the specific electronic voucher, (iii) issuance value of the specific electronic voucher, (iv) a unique ID of the specific issuer, and (v) an expiration date of the specific electronic voucher;
    determining, using the server, validity of (i) the specific issuing data, (ii) the public key of the specific issuer, and (iii) the signature value of the specific issuer;
    once each of the validities are determined,
        performing, using the server, processes of registering in a private blockchain network, a voucher-issuing transaction of the specific electronic voucher including (i) the specific issuing data, (ii) the public key of the specific issuer, and (iii) the signature value of the specific issuer;
        providing, using the server, a PrivTxid representing a location of the voucher-issuing transaction registered in the private blockchain network, and
        performing, using the server, processes of registering in a public blockchain network, a first function value of the voucher issuing transaction of the specific electronic voucher, and acquiring a Txid representing a location of the first function value registered in the public blockchain network, and
    wherein the voucher issuing transaction of the specific electronic voucher is used to
        define a process related to the specific electronic voucher and indicate issuing of the specific electronic voucher,
        define a tangible or intangible value of the specific electronic voucher, and
        identify the specific issuer.

2. The method of claim 1, wherein the unique ID includes one of a function value of the public key of the specific issuer and a value including the function value of the public key of the specific issuer.

3. The method of claim 1, further comprising:
    determining that the signature value of the specific issuer is valid using the public key of the specific issuer registered by the specific issuer.

4. The method of claim 1, further comprising:
    acquiring a request for registration of the specific issuer with the public key of the specific issuer, determining that the specific issuer is valid, and transmitting a random nonce to the specific valid issuer; and
    acquiring a signature value of the random nonce generated by signing the random nonce with the private key of the specific issuer and (i) verifying that the signature value of the random nonce is legitimately signed using the public key of the specific issuer, (ii) registering a second function value of (ii-1) the random nonce, (ii-2) the signature value of the random nonce, and (ii-3) the public key of the specific issuer, in the public blockchain network, and (iii) acquiring a second transaction ID representing a location of the second function value on the public blockchain network.

5. The method of claim 4, further comprising:
    registering in a private blockchain network an issuer-registering transaction including (i) the random nonce, (ii) the signature value of the random nonce, and (iii) the public key of the specific issuer, and providing a PrivTxid representing a location of the issuer-registering transaction on the private blockchain network to the specific issuer.

6. The method of claim 4, further comprising:
    determining that the specific issuer is valid using one of a certificate based on a public key infrastructure and information on an identification of the specific issuer.

7. A server for issuing at least one specific electronic voucher granting a transferrable monetary value by at least one specific issuer, comprising:
- at least one memory that stores instructions; and
- at least one processor configured to execute the instructions to perform processes of:
- receiving from a specific issuer, at the server, a request for issuing the specific electronic voucher;
- acquiring in the request, at the server, (i) specific issuing data, (ii) a public key of the specific issuer, and (iii) a signature value of the specific issuer generated by signing the specific issuing data with a private key of the specific issuer or signing a voucher function value of the specific issuing data with the private key of the specific issuer, wherein the specific electronic voucher also has a transferrable monetary value, wherein the specific issuing data includes at least one of (i) a type of the specific electronic voucher, (ii) a public key of a specific user who is a buyer of the specific electronic voucher, (iii) issuance value of the specific electronic voucher, (iv) a unique ID of the specific issuer, and (v) an expiration date of the specific electronic voucher;
- determining, using the server, validity of (i) the specific issuing data, (ii) the public key of the specific issuer, and (iii) the signature value of the specific issuer;
- once each of the validities are determined,
  - performing, using the server, processes of registering in a private blockchain network, a voucher-issuing transaction of the specific electronic voucher including (i) the specific issuing data, (ii) the public key of the specific issuer, and (iii) the signature value of the specific issuer;
  - providing, using the server, a PrivTxid representing a location of the voucher-issuing transaction registered in the private blockchain network; and
  - performing, using the server, processes of registering in a public blockchain network, a first function value of the voucher issuing transaction of the specific electronic voucher, and acquiring a Txid representing a location of the first function value registered in the public blockchain network, and
- wherein the voucher issuing transaction of the specific electronic voucher is used to
  - define a process related to the specific electronic voucher and indicate issuing of the specific electronic voucher,
  - define a tangible or intangible value of the specific electronic voucher, and
  - identify the specific issuer.

8. The server of claim 7, wherein the processor further executes the instructions to perform processes of:
- acquiring a request for registration of the specific issuer with the public key of the specific issuer, determining that the specific issuer is valid, and transmitting a random nonce to the specific valid issuer; and
- acquiring a signature value of the random nonce generated by signing the random nonce with the private key of the specific issuer and (i) verifying that the signature value of the random nonce is legitimately signed using the public key of the specific issuer, (ii) registering a second function value of (ii-1) the random nonce, (ii-2) the signature value of the random nonce, and (ii-3) the public key of the specific issuer, in the public blockchain network, and (iii) acquiring a second transaction ID representing a location of the second function value on the public blockchain network.

9. The server of claim 8, wherein the processor further executes the instructions to perform processes of registering in a private blockchain network an issuer-registering transaction including (i) the random nonce, (ii) the signature value of the random nonce, and (iii) the public key of the specific issuer, and providing a PrivTxid representing a location of the issuer-registering transaction on the private blockchain network to the specific issuer.

* * * * *